US012261366B1

(12) United States Patent
Wink et al.

(10) Patent No.: US 12,261,366 B1
(45) Date of Patent: Mar. 25, 2025

(54) HORN ANTENNAS WITH INTEGRATED FEED NETWORKS

(71) Applicant: Lockheed Martin Corporation, Bethesda, MD (US)

(72) Inventors: Timothy Patrick Wink, Castle Rock, CO (US); Cory W. Craddock, Denver, CO (US); Jason Stewart Wrigley, Littleton, CO (US)

(73) Assignee: LOCKHEED MARTIN CORPORATION, Bethesda, MD (US)

(*) Notice: Subject to any disclaimer, the term of this patent is extended or adjusted under 35 U.S.C. 154(b) by 712 days.

(21) Appl. No.: 17/573,712

(22) Filed: Jan. 12, 2022

(51) Int. Cl.
*H01Q 21/06* (2006.01)
*H01P 1/161* (2006.01)
*H01Q 13/02* (2006.01)
*H01Q 21/00* (2006.01)

(52) U.S. Cl.
CPC ........... *H01Q 21/064* (2013.01); *H01P 1/161* (2013.01); *H01Q 13/0283* (2013.01); *H01Q 21/0087* (2013.01)

(58) Field of Classification Search
CPC .. H01P 1/161; H01Q 21/064; H01Q 13/0283; H01Q 21/0087
See application file for complete search history.

(56) References Cited

U.S. PATENT DOCUMENTS

| | | | | |
|---|---|---|---|---|
| 6,703,976 | B2 * | 3/2004 | Jacomb-Hood | H01Q 1/288 342/373 |
| 10,320,085 | B1 | 6/2019 | Lier et al. | |
| 10,665,931 | B2 * | 5/2020 | Lier | H01P 1/173 |
| 10,749,252 | B1 | 8/2020 | Lier et al. | |
| 11,552,412 | B2 * | 1/2023 | Wink | H01Q 21/064 |
| 2005/0104791 | A1 | 5/2005 | Sun et al. | |
| 2014/0022137 | A1 * | 1/2014 | Bosshard | H01Q 21/28 343/835 |

OTHER PUBLICATIONS

Jazani, Ghoncheh et al., "Design Of Dual-Polarized (RHCP/LHCP) Quad-Ridged Horn Antenna With Wideband Septum Polarizer Wave Guide Feed," IET Microwaves, Antennas & Propagation, vol. 12, Iss. 9, pp. 1541-1545, 2018.

(Continued)

*Primary Examiner* — Andrea Lindgren Baltzell
*Assistant Examiner* — Kimberly E Glenn

(57) ABSTRACT

Provided herein are various enhancements for radio frequency (RF) horn antenna systems and arrays. An example apparatus includes a horn antenna array formed in a single workpiece of material comprising horn antenna elements with integrated feed networks. Each of the integrated feed networks comprise a waveguide interface flange having a port, and a filter element having a serpentine cavity coupled to the port that is at least partially formed by a base section, where a separation interface is established between the base section and an attachable cap that forms a remainder of the serpentine cavity. Each of the integrated feed networks also comprise a polarizer element having a waveguide cavity that couples between the serpentine cavity of the filter element and an associated horn antenna element that forms a signal aperture.

20 Claims, 7 Drawing Sheets

(56) References Cited

OTHER PUBLICATIONS

Ordek, Sezgin et al., "Horn Array Antenna Design For Ku-Band Applications," 2015 9th International Conference on Electrical and Electronics Engineering, pp. 351-354, Nov. 26-28, 2015.

Silver, Samuel, "Microwave Antenna Theory and Design," First Edition, 10.15 The Box Horn,, pp. 377-380, 1949.

Vettikalladi, Hamsakutty et al., "High Gain and High Efficient Stacked Antenna Array With Integrated Hom for 60 GHz Communication Systems," International Journal of Antennas and Propagation, vol. 2014, 9 pages, Apr. 22, 2014.

Young, Leo et al., "Meander-Line Polarizer," IEEE Transactions on Antennas and Propagation, pp. 376-378, May 1973.

Zhang, J. C. et al., "Multifunctional Meander Line Polarizer," Progress in Electromagnetics Research Letters, vol. 6, pp. 55-60, 2009.

* cited by examiner

HORN ANTENNAS WITH INTEGRATED FEED NETWORKS

TECHNICAL BACKGROUND

Aperture antennas are a form of radio frequency (RF) antenna used for directed transmission and reception of various RF signals, often employed in microwave radio transmissions or in reflector antenna feed systems. One example aperture antenna, a horn antenna, comprises a source port which feeds into a flared volume surrounded by walls that define the general horn-like shape. A horn aperture or opening then transmits/receives signals to/from external nodes. Arrays of horn antennas can be formed and used to produce multibeam Electrically Steerable Arrays (ESAs). ESAs are often deployed on satellites placed into various orbital configurations for communication with earth-based stations over a range of aiming configurations. When employed for microwave and millimeter-wave RF applications, horn arrays and connected waveguide filters offer low loss and high efficiency as compared to other antenna types.

Along with the horn antenna elements themselves, other components are often employed in concert to form a complete antenna system. These other components can be referred to as a feed network and include polarizers, filters, waveguides, interfacing elements, and other RF components. For example, polarizers can be employed in RF feed networks which convert polarizations of signals between linear and circular polarizations, and vice-versa. Typically, these components are machined or cast from separate metallic workpieces which are then screwed or bolted together to form individual horn antennas, and many individual horn antennas are then bolted together to form large arrays. Unfortunately, such arrangements are high complexity and high mass, and require complex manufacturing processes to assemble and ensure proper alignment and RF interfacing between separate pieces. This can limit applications and performance of horn antennas on weight-sensitive satellite-mounted ESA systems.

OVERVIEW

Provided herein are various enhancements for radio frequency (RF) horn antenna systems and arrays that integrate horn antenna elements with associated feed networks. These horn antenna elements and integrated feed networks can be manufactured using injection molding techniques that incorporate draft angles into the associated geometry and preclude undercuts or overhangs. Thus, the horn antenna elements and integrated feed networks discussed herein can be formed from a single workpiece using an injection molding technique, and later plated with a conductive material on RF-carrying surfaces. This leads to a large reduction in manufacturing complexity, cost, and mass—while simultaneously increasing performance characteristics with relation to other types of horn antenna arrays.

One example implementation includes an apparatus that includes a horn antenna array formed in a single workpiece of material comprising horn antenna elements with integrated feed networks. Each of the integrated feed networks comprise a waveguide interface flange having a port, and a filter element having a serpentine cavity coupled to the port that is at least partially formed by a base section, where a separation interface is established between the base section and an attachable cap that forms a remainder of the serpentine cavity. Each of the integrated feed networks also comprise a polarizer element having a waveguide cavity that couples between the serpentine cavity of the filter element and an associated horn antenna element that forms a signal aperture.

Another example implementation includes a method of manufacturing. The method includes forming a horn antenna array in a single workpiece of material comprising horn antenna elements with integrated feed networks. Forming each of the integrated feed networks comprises forming a waveguide interface flange having a port, and forming a filter element having a serpentine cavity coupled to the port that is at least partially formed by a base section, where a separation interface is established between the base section and an attachable cap that forms a remainder of the serpentine cavity. Forming each of the integrated feed networks also comprises forming a polarizer element having a waveguide cavity that couples between the serpentine cavity of the filter element and an associated horn antenna element. Forming each of the horn antenna elements comprises forming a horn structure and forming a signal aperture.

Yet another example implementation includes an apparatus comprising a horn antenna assembly formed in a single workpiece of material having a horn antenna element and an integrated feed network. The integrated feed network comprises a waveguide interface flange comprising a port, and a filter element comprising a serpentine cavity coupled to the port and is at least partially formed by a base section, where a separation interface is established between the base section and an attachable cap that forms a remainder of the serpentine cavity. The integrated feed network also comprises a polarizer element comprising a waveguide cavity that couples between the serpentine cavity of the filter element and a horn antenna element comprising a signal aperture.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
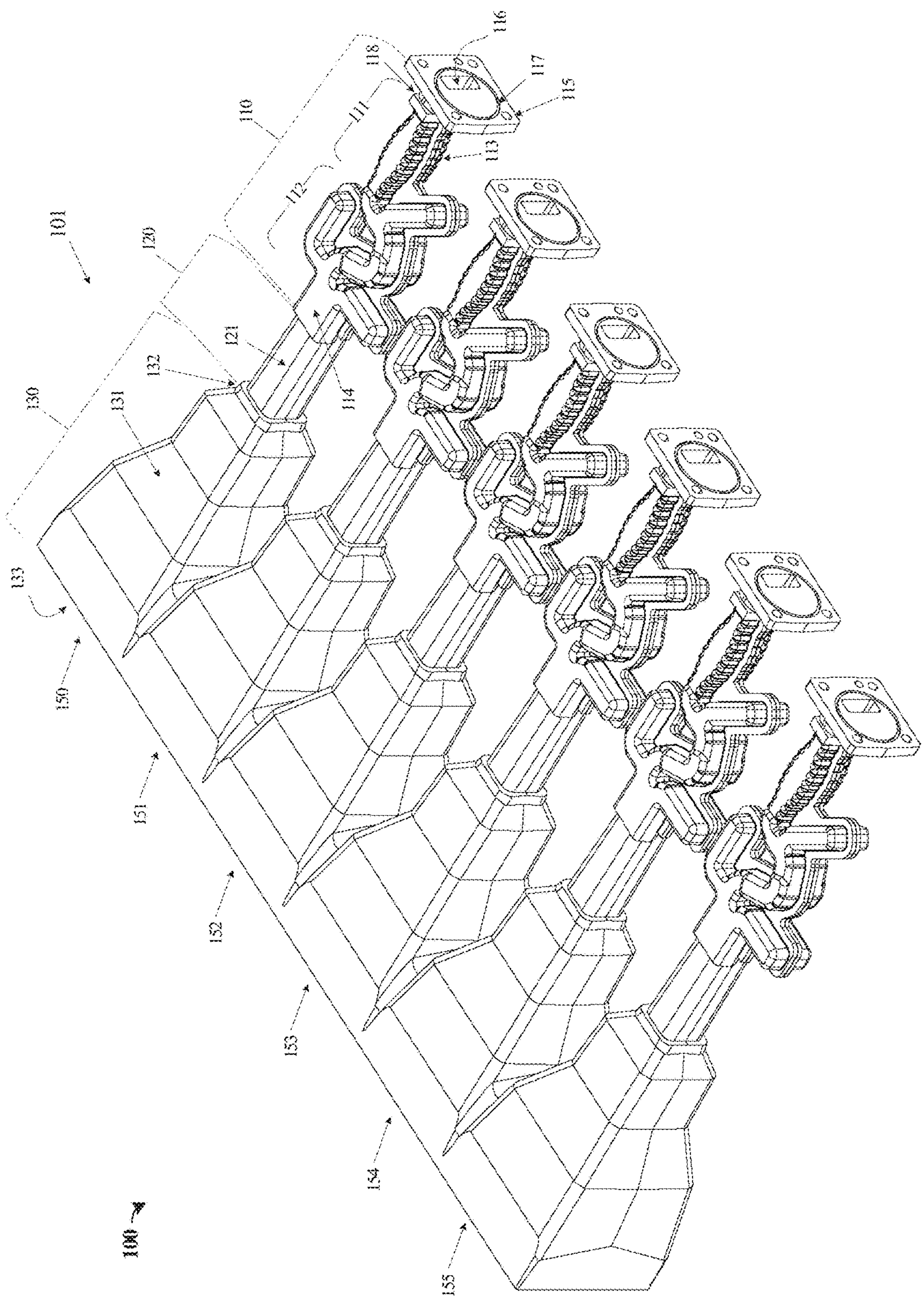
FIG. 1 illustrates a horn antenna array in an implementation.

Aperture antennas are often employed in microwave RF transmissions, such as in directional antenna feed systems or direct-radiating antenna systems. Aperture antennas and associated arrays are a class of antennas which emit RF energy from a corresponding aperture or opening, and include horn antennas, short backfire antennas, and waveguide aperture antennas. Large arrays of such antennas, perhaps using hundreds of elements, can form electronically steerable arrays (ESAs) for satellite communications, terrestrial backbone communications, aircraft communications, radar systems, directed energy applications, and other various applications using signal phase shifting among each antenna of the array to achieve a desired directionality.

In one example, a horn antenna comprises a source port which feeds into a flared volume surrounded by walls that define the general shape of the horn antenna. Along with the horn antennas, other components are often employed in series to form a complete aperture antenna system. These other components can be referred to as a feed network and include polarizers, filters, waveguides, interfacing elements, and other RF components. Arrays of horn antennas can be formed by joining together many individually-manufactured horn antennas or by forming a plurality of horn elements with a unified workpiece. Various subtractive or additive manufacturing techniques can be employed. Subtractive manufacturing techniques include machining and similar techniques, while additive manufacturing techniques include casting, molding, and 3D printing techniques, among others. However, use of plastic injection molding to manufacture horn arrays has been limited due to challenges in forming internal cavities and other various feed network features while maintaining draft angles required by the injection molding process, especially for the small feature sizes for RF wavelengths of the X-band (approximately 8 to 12 GHZ), Ku-band (approximately 12 to 18 GHZ), Ka-band (approximately 26.5-40 GHz), or millimeter wavelength bands. It should be understood that other RF bands and wavelengths can be supported with accompanying scaling in size or geometry suitable to the corresponding wavelengths.

Discussed herein are several enhanced techniques and structures for producing arrays of horn antennas having integrated feed networks, while allowing for various manufacturing techniques such as injection molding. The traditional approach is to manufacture each horn antenna and corresponding feed network elements (e.g. polarizer and filter elements), as individual components employing mechanical joints or connections between the components as well as using multiple assemblies within the components, such as split blocks. This traditional approach results in a longer/taller (i.e. less compact) structure along with higher recurring costs, higher assembly costs and time, higher testing labor, and higher mass to achieve a complete horn array assembly. In addition, critical performance parameters such as axial ratio and overall insertion loss can be impacted. The examples discussed herein can form a horn antenna, along with a polarizer and filter, as a single integrated component. Arrays of such elements can also be formed as a single integrated component. The entire array or assembly can use a meander or serpentine approach for filter cavities and other waveguide components to fit within a shorter length envelope. Other example implementations might not incorporate serpentine filter cavities, and instead include non-serpentine filter cavities. While serpentine cavities can reduce an overall aperture length of each horn antenna assembly for smaller packaging, generally straight filter cavities can instead be employed.

Moreover, injection molding techniques can be employed to achieve cost savings in large quantities, such as forming large arrays or horn antenna structures in ESAs. When injection molding or casting techniques are employed to manufacture polarizers, filters, and associated horn structures, draft angles are included to slope cross-sectional areas along certain axes. These draft angles, approximately 1° or 2°, are typically a requirement of the manufacturing tooling or process to prevent material overhangs or parallel surfaces in order to release the workpiece from a mold or die. However, the specific requirements of injection molding tooling, namely use of draft angles, can pose challenges for traditional feed networks and horn antennas. When an injection molding or casting process is employed an assembly, each portion of the assembly comprises geometry incorporating draft angles corresponding to the selected molding or casting technique, and can be formed from a single workpiece or molded piece of material. In some manufacturing scenarios, a reflection or change in draft angles is employed corresponding to a different tooling pull or extraction directions to form the single part/piece. For example, tooling used to form a first portion is pulled (or extracted) in a first direction, and tooling used to form a second portion is pulled (or extracted) in a second direction. The direction of draft angles for interior cavity features are typically mirrored or opposite from draft angles for exterior features (e.g. exterior walls). This change in draft angle direction accommodates mold elements (e.g. die or mandrel) inserted into cavities during an injection molding process. Thus, external features will generally increase in size/diameter, while internal features will generally decrease in size/diameter over the pull direction. Injection molding results in a significant mass decrease, fewer mechanical operations, and order of magnitude materials cost decrease when manufacturing large quantities of filters, polarizers, or horn antennas when compared to manufacturing using electrical discharge machining (EDM) or direct machining. Additionally the polarizers and associated horn antennas can utilize a square aperture which provides higher spatial efficiency and performance when deployed in an array. Circular, triangular, hexagonal, or irregular horn antennas can instead be employed using similar techniques.

Materials employed for the elements of the feed networks and horn antenna elements (or any of the various components discussed herein) can include any injection-moldable material. Examples include plastics, polymers, carbon composites, polyamide, acrylic, polycarbonate, polyoxymethylene, polystyrene, acrylonitrile butadiene styrene (ABS), polypropylene, polyethylene, polyurethane, thermoplastic rubber, including combinations thereof. Additionally, various additives can be included in the injected material, such as stabilizers, glass or organic fibers, structural elements, lubricants, mold release agents, or other additives. The material can be injected via at least one port into a mold or die which forms the shapes and cavities of the associated elements. Once formed, conductive surface treatments are typically applied at least to surfaces in contact with RF signals. These conductive surface treatments include various platings or electroplated materials, including conductive materials, metallic substances, metals, metal alloys, and the like, such as aluminum, copper, silver, gold, nickel, or other similar metals or associated combinations. The surface treatment might have a layer thickness of 0.001 inch or less.

Figure 2:
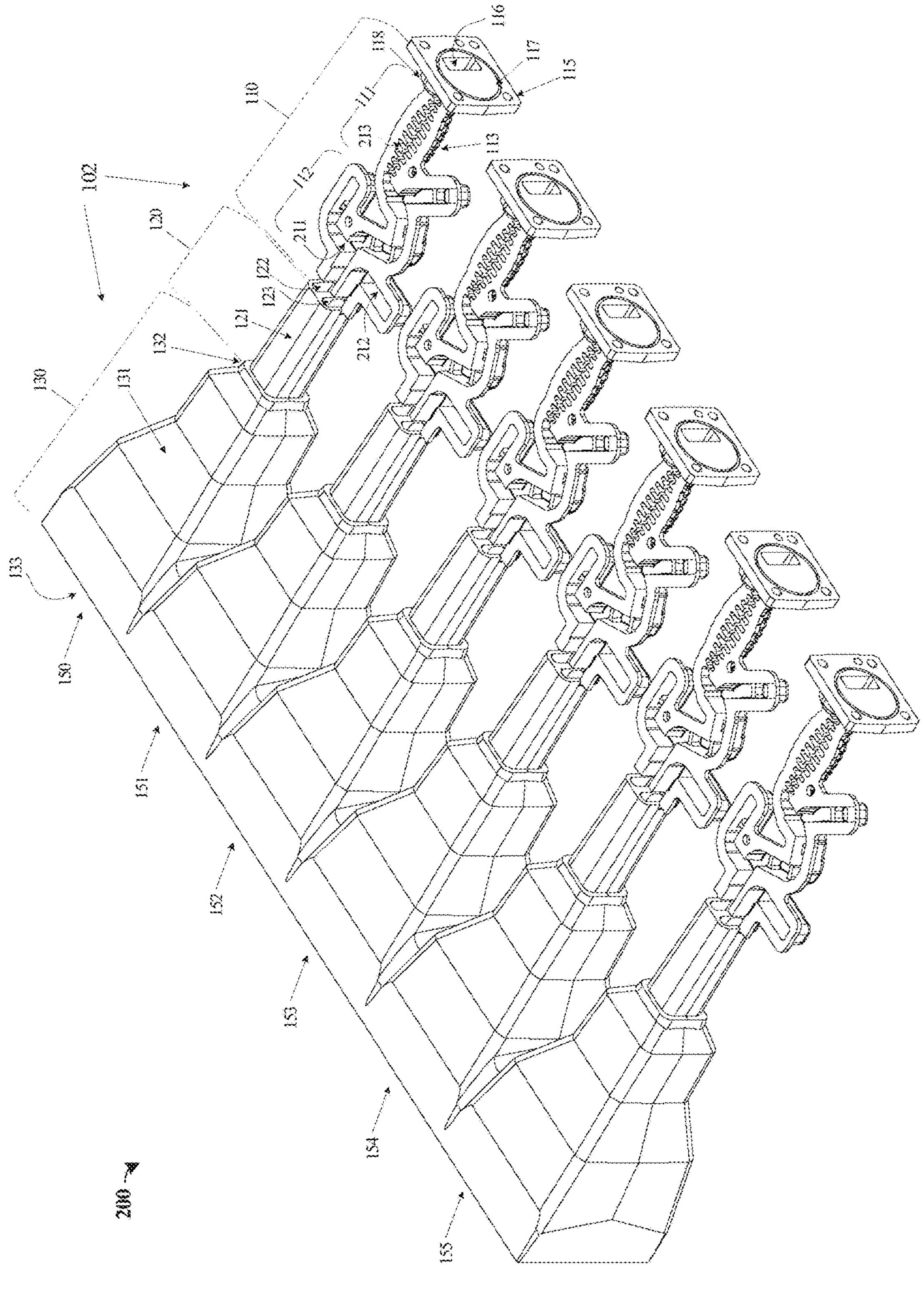
FIG. 2 illustrates a horn antenna array in an implementation.

Turning now to a first example polarizer feed, FIGS. 1 and 2 are presented. FIG. 1 illustrates isometric view 100 of antenna array 101 in an implementation. FIG. 2 illustrates isometric view 200 of sub-assembly 102 of antenna array 101 in an implementation, but with attachable caps (114) omitted from the filter components of antenna array 101. Antenna array 101 includes a row of 1×6 horn antenna assemblies (150-155). Antenna array 101 forms a radio frequency (RF) front end comprising several components that are integrated into a single workpiece. Notably, these components include interface flanges, filters, polarizers, and horn elements for several horn antenna assemblies. Several such rows of horn antenna assemblies can be merged into a larger assembly, such as to form a large array or grid of horn antenna assemblies for use in an ESA arrangement. When injection molding manufacturing techniques are employed, all RF front end components of a horn antenna array can be combined into a single injection-molded workpiece. This advantageously provides for a low-cost, low-mass, high-performance, and mass-producible RF front end as compared to traditional machining (i.e. bending sheet metal, milling, or EDM) techniques.

Detailed labeling for elements for horn antenna assembly 150 are shown in FIGS. 1 and 2, and each of the other horn antenna assemblies can include similar elements. Horn antenna assembly 150 comprises interface flange 115, filter element 110, polarizer element 120, and horn element 130. Horn antenna assembly 150 also includes attachable cap 114 (shown as removed from horn antenna assemblies 150-155 in FIG. 2). Horn elements of horn antenna assemblies 150-155 are coupled at associated apertures (e.g. 133) by the material used to form antenna array 101, although separate horn elements can be achieved by having the associated material have gaps. Alternatively, or in combination, material can span between the individual interface flanges of horn antenna assemblies 150-155. FIGS. 1 and 2 shows separated interface flanges as one example implementation.

Interface flange 115 comprises a waveguide interface flange having features to couple a corresponding horn antenna assembly to a waveguide which transfers signals over signal port 116. Interface flange 115 thus comprises signal port 116 and sealing feature 117, along with various bolt patterns or holes. Although one signal port 116 is shown for interface flange 115, other examples of interface flange 115 can include more than one port, such as ports for both left-hand polarization and right-hand polarization signals, among other configurations. Interface flange 115 can be employed to transition an internal cavity of filter element 110 to signal port 116 having a standardized waveguide type or size. These standardized waveguide sizes can include WR-34, WR-42, WRD-580, among others. Interface flange 115 can also provide a structural mount for horn antenna assemblies 150-155. Interface flange 115 can include transformer portions, such as for a ¼ wavelength (λ) transformer to a rectangular waveguide. Although not shown in FIGS. 1 and 2, interface flange 115 can incorporate a structural insert into the molded portion of the workpiece that forms interface flange 115. This structural insert can comprise a metallic piece or other suitable material which acts as a rigidity element for interface flange 115 and reduces or eliminates viscoelastic creep at the joint between interface flange 115 and any coupled waveguide. Properties of the rigidity element are selected to reduce viscoelastic creep of an interface or joint between the interface flange 115 and a mating waveguide to below a threshold level. These properties can take into account product lifetimes or life cycles and material deformation properties, such as the material used to form the bulk of interface flange 115. To compensate for irregularities and ensure proper RF sealing between interface flange 115 and the associated waveguide, sealing feature 117 can form or accommodate an electromagnetic (EM) seal, such as a gasket or adhesive. Example gaskets or seals include metal impregnated rubber or silicone gaskets, conductive adhesives, or coiled spring gaskets, among other elements. When interface flange 115 is mated to a waveguide, such by associated fasteners, the seal or gasket can compress within sealing feature 117 and provide an EM sealing. Sealing feature 117 can also comprise a raised surface feature that creates a high-pressure interface for RF sealing of interface flange 115 with a mating waveguide, or to separate/isolate ports on interface flange 115 when more than one port is included. Sealing feature 117 can be formed from the same material as interface flange 115, although variations are possible.

Filter element 110 comprises a serpentine or meandering waveguide cavity formed by bandpass section 111 and mode suppression section 112. The filtering characteristics and performance of bandpass section 111 are determined by the geometry and structure of filter waveguide cavity 213, which establishes the ranges of RF signal frequencies that are passed and rejected. In some examples, bandpass section 111 can form a "type 1" bandpass filter. The serpentine cavity of filter element 110 also comprises mode suppression cavities 211-212 between bandpass section 111 and polarizer element 120. Mode suppression cavities 211-212 can aid in suppression of unwanted transmission modes as well as provide attenuation or cut off of polarization portions of transiting signals. This serpentine waveguide cavity is shown in more detail in FIG. 4. Also, end seal 118 is provided to establish an overlapping RF seal at interface flange 115. This end seal 118 is discussed in more detail in the Figures below.

Filter element 110 is formed from two longitudinal portions or halves. Filter element 110 is at least partially formed by base section 113. Attachable cap 114 forms a remainder of filter element 110 and associated serpentine cavity. A separation interface is established between base section 113 and attachable cap 114 which is typically sealed against RF leakage. This arrangement of base section 113 and attachable cap 114 forms two half-block elements which are mated together. The separation interface is such that fasteners are not required and is able to seal along the entire peripheral of the affected sections/components. This arrangement also reduces misalignment between base section 113 and attachable cap 114. In some examples, the separation interface can be established along the middle of the H-plane or broad wall where no currents are crossing to allow a more resilient interface between base section 113 and attachable cap 114. This location can also be referred to as the zero current plane. Various adhesives or bonding material can be deposited at the separation interface, which may include one or more grooves or ridges to provide features into which the bonding material can reside. Example bonding material includes conductive adhesive liquid, conductive tape epoxy, cut sheets of conductive epoxy, metallic impregnated adhesives, conductive gaskets, or other materials applied on mating surfaces. The conductive impregnation material can include conductive or metallic components like silver. Example epoxy materials include Loctite® Ablestik 8175. Grooves or ridges can help contain or guide liquid adhesives or provide bonding stops for adhesives. Alternatively, screws or straps can bond base section 113 to attachable cap 114.

Polarizer element 120 comprises a waveguide cavity formed by polarizer body 121 which couples to the waveguide cavity of filter element 110 at two ports, namely ports 122-123 (see in FIG. 2). In this example, port 123 corresponds to a left-hand polarization (LHP) signal and port 122 corresponds to a right-hand polarization (RHP) signal. Other configurations of ports and polarizations are possible depending on the polarizer configuration. Polarizer element 120 then couples to horn element 130 at horn port 132.

Figure 6:
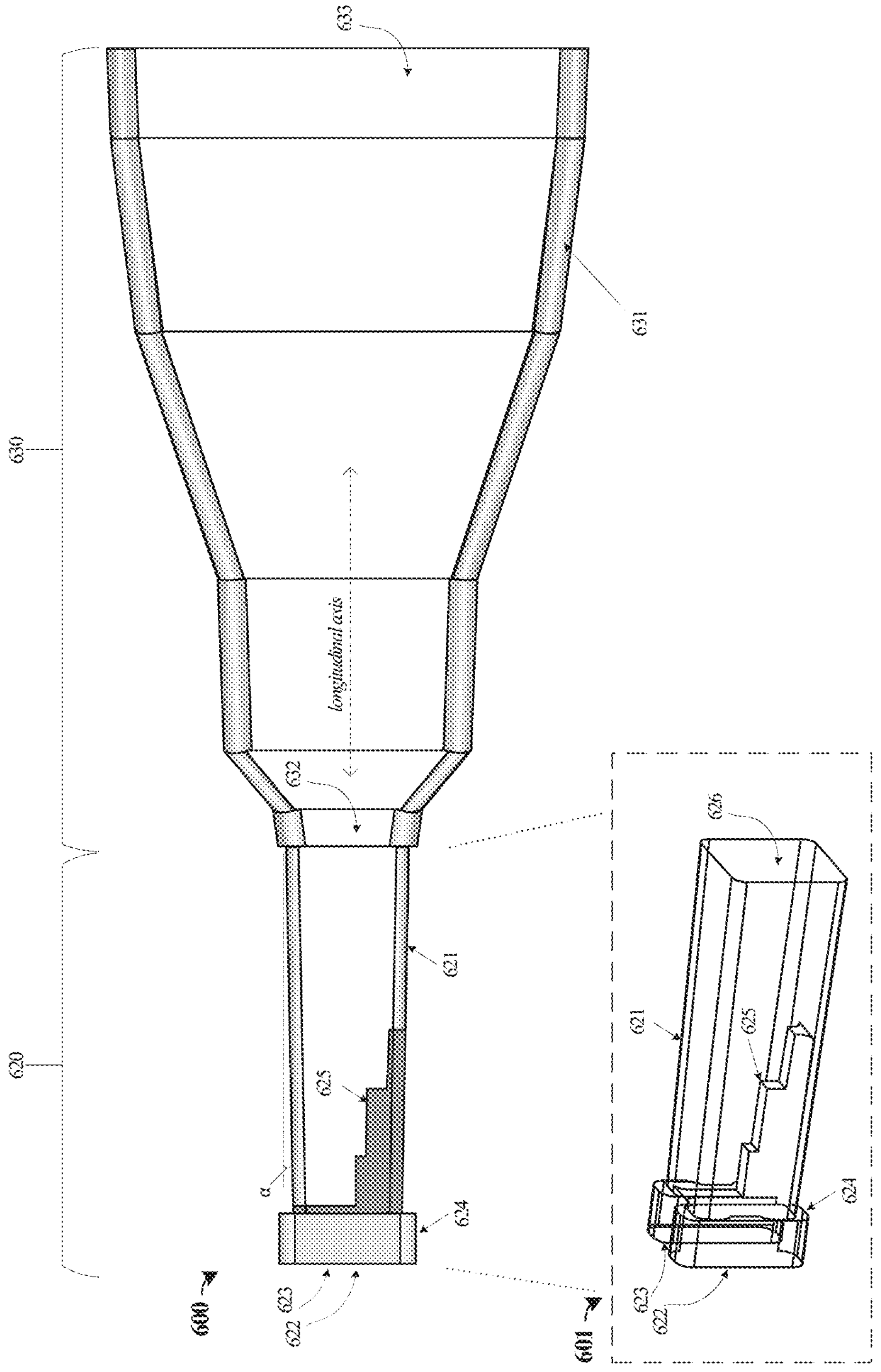
FIG. 6 illustrates detailed views of a portion of a horn antenna assembly in an implementation.

Polarizers, such as polarizer element 120, can be deployed in microwave RF feed networks to convert polarizations of signals between linear and circular polarizations, and vice-versa. Linear (or single) polarization typically refers to an electromagnetic signal propagating in a single plane along the direction of propagation, while circular polarization includes two linear components that are perpendicular to each other and having a phase difference of 90° ($\pi/2$). Other polarizations are possible, such as elliptical. Often, feed networks with polarizers are coupled to horn antennas used for transmitting or receiving microwave communications. Conversion of polarizations of signals in such communication systems can enable more effective communications between endpoints having varied or unpredictable orientations. For example, it can be helpful to use circular polarization to communicate from a satellite to ground stations, aircraft, or vehicles. Some polarizers comprise septum orthomode transducer (OMT) polarizers (SPOLs) that include a stepped separator or septum positioned between polarization ports of the polarizer. FIG. 6 illustrates further details on a septum polarizer.

Horn element 130 forms RF aperture 133 for horn antenna assembly 150, from which RF signals can be transmitted and RF signals can be received with respect to remote communication nodes. Horn element 130 also includes horn body 131 and signal port 132. Signals are transferred between polarizer element 120 via signal port 132, and horn body 131 forms the horn-shaped shell of material which tapers outward in diameter from signal port 132 to aperture 133. As mentioned, although a square aperture geometry is employed for horn element 130, other geometries can instead be used.

Figure 3:
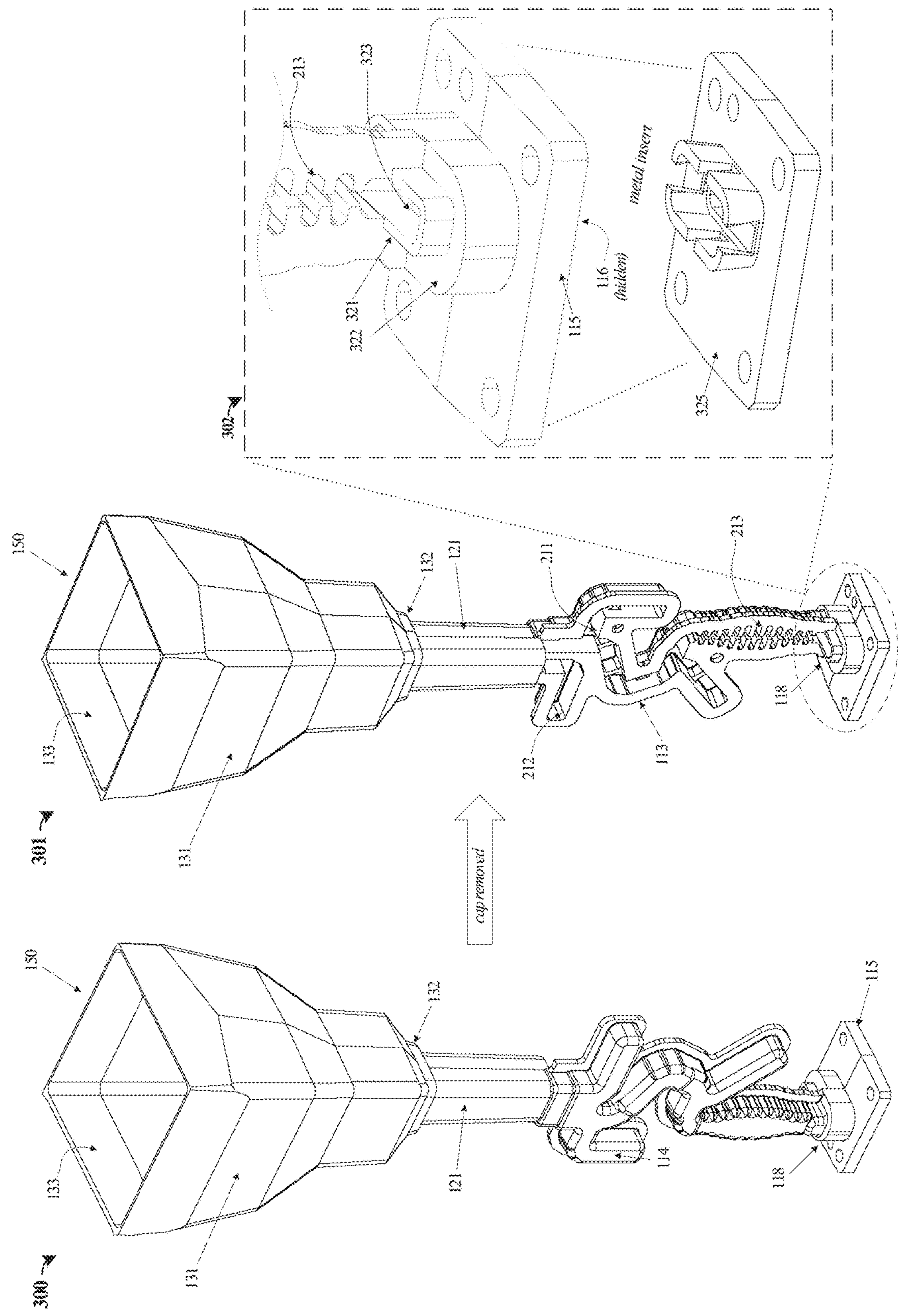
FIG. 3 illustrates a horn antenna assembly in an implementation.

FIG. 3 is presented which shows detailed views 300, 301, and 302 of a single horn antenna assembly, namely assembly 150 of FIGS. 1 and 2, although similar features can be included for horn antenna assemblies 151-155. As with FIGS. 1 and 2, horn antenna assembly 150 can be formed from a single piece of material, such as by using an injection molding technique. Also, horn antenna assembly 150 might be formed into a row or sub-array with many such horn antenna assemblies, all from a single piece of material. Multiple instances of horn antenna assembly 150 or a single horn antenna assembly can be formed into a large array by combining individual horn antenna assemblies or sub-arrays thereof. View 300 shows horn antenna assembly 150 having attachable cap 114 bonded to base section 113. View 301 shows horn antenna assembly 150 having attachable cap 114 removed from base section 113. Detailed inset view 302 shows additional features surrounding interface flange 115.

Turning to detailed inset view 302, portions of end seal 118 on base section 113 is shown as providing a portion of the overlapping RF seal at interface flange 115. Signal port 116 (hidden from view) couples to inner port 323 which is covered by end seal 118 when attachable cap 114 is bonded to base section 113. Inner port 323 couples to filter waveguide cavity 213, which further couples to mode suppression cavities 211-212. Also included in view 302 are RF seal surfaces 321-322. These form an arc or 'U' shaped overlapping interface between base section 113 and attachable cap 114, which also provides for alignment between base section 113 and attachable cap 114. Conductive adhesive can be applied at RF seal surfaces 321-322 when attachable cap 114 is bonded to base section 113 to prevent leakage of RF signals from the associated joints between base section 113 and attachable cap 114. Other alignment or sealing features, such as grooves pins/holes, or ridges can be incorporated to catch/hold adhesive and align base section 113 to attachable cap 114.

Interface flange 115 also can include rigidity element 325. Rigidity element 325 comprises a structural insert into the molded portion of the workpiece that forms interface flange 115. Rigidity element 325 can comprise a metallic piece or other suitable material which reduces or eliminates viscoelastic creep at the joint between interface flange 115 and any coupled waveguide. Properties of rigidity element 325 are selected to reduce viscoelastic creep of an interface or joint between the interface flange 115 and a mating waveguide to below a threshold level. Rigidity element 325 can be a separately manufactured piece, such as formed by a stamped metal, casting, or machining process. During formation of the material of interface flange 115 and horn antenna assembly 150, rigidity element 325 can be inserted into a mold to have material formed around rigidity element 325 and thus become embedded into such material. Common or shared mounting holes can be included in rigidity element 325 as well as interface flange 115 to provide pass-through for bolts or other fasteners. Rigidity element 325 also can include protrusions or cavity features to hold or grab the material (e.g. plastic material) that forms interface flange 115 to ensure proper purchase and alignment within interface flange 115. Although one interface flange 115 is shown with one rigidity element 325, arrays or rows of horn antenna assemblies can include rigidity elements that are coupled by webbing or metal so as to couple across interface flanges of many horn antenna assemblies. This can reduce the part count to a single rigidity element per workpiece.

Figure 4:
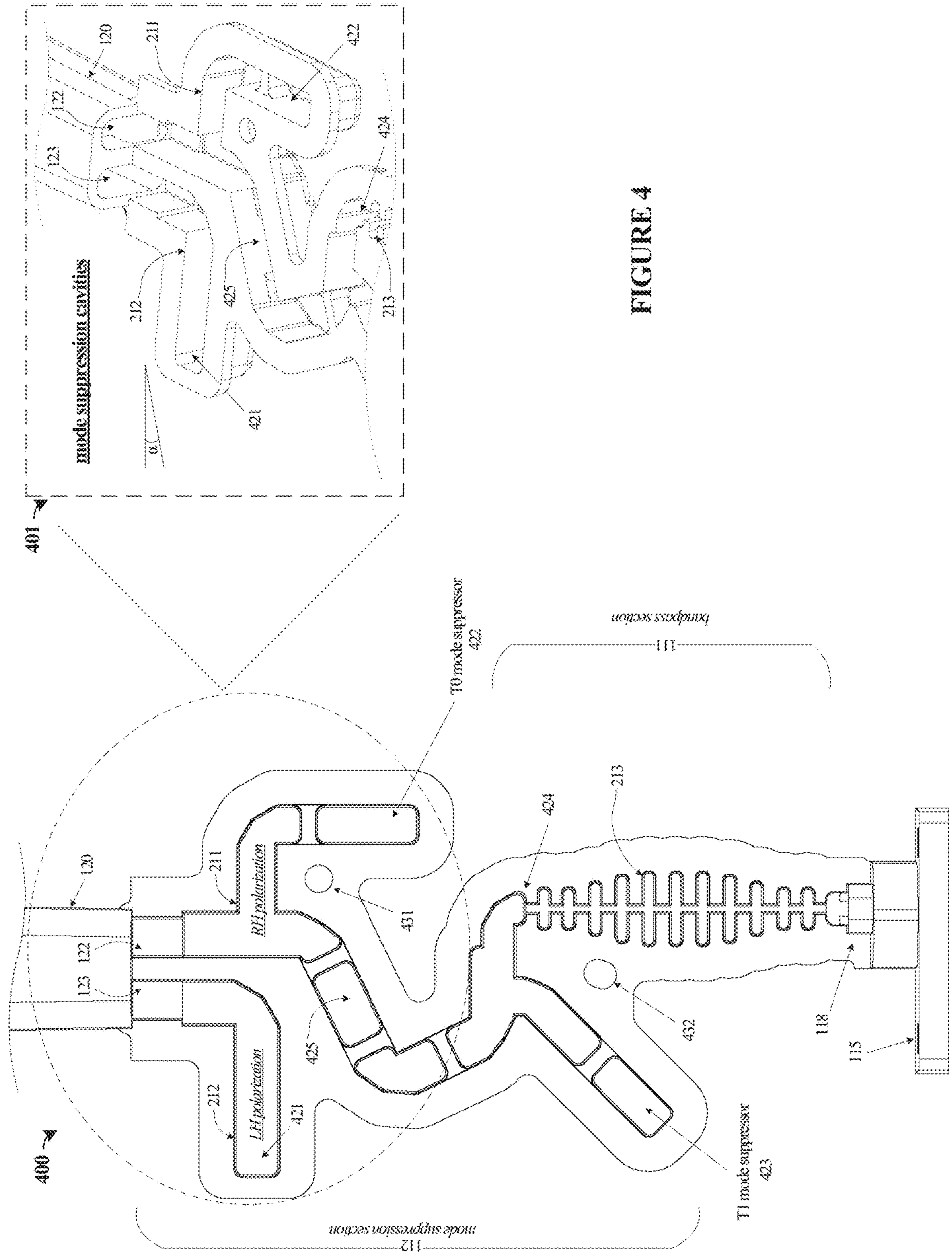
FIG. 4 illustrates detailed views of a horn antenna assembly in an implementation.
Figure 5:
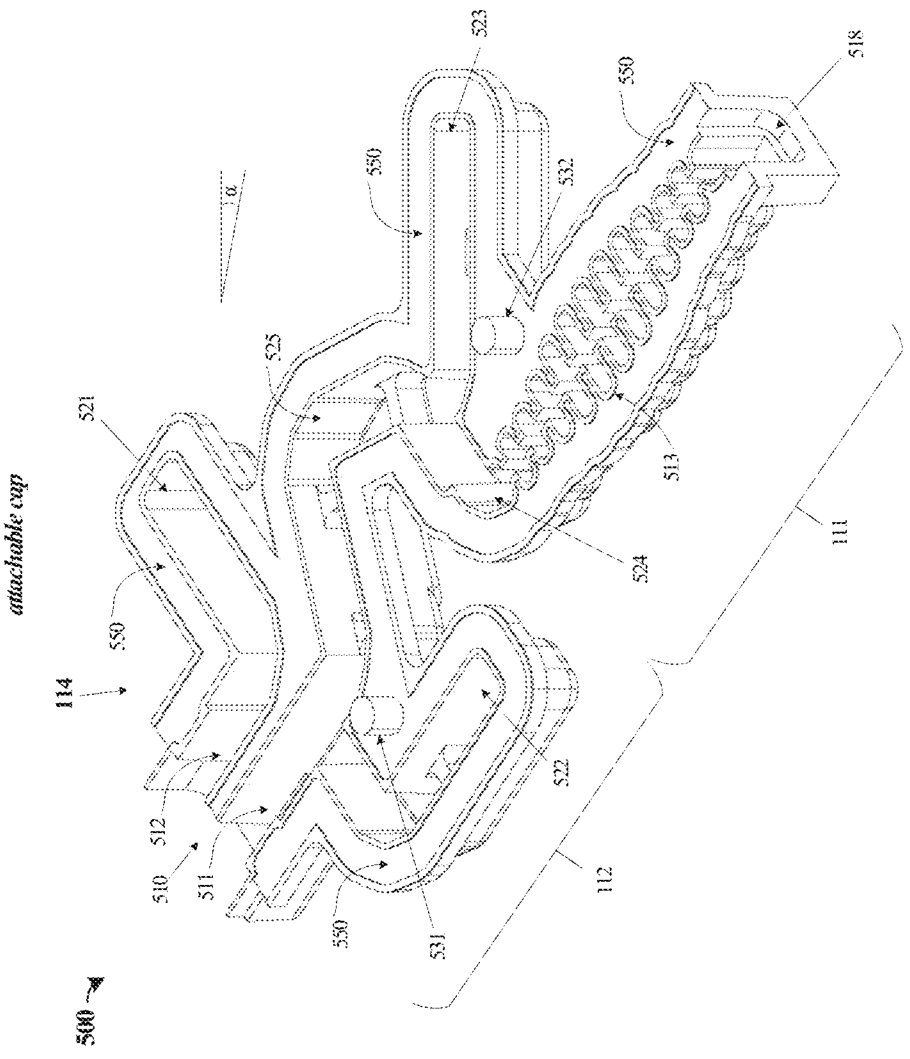
FIG. 5 illustrates detailed views of an attachable cap for a horn antenna assembly in an implementation.

FIG. 4 includes detailed views 400 and 401 of a portion of the serpentine or meandering cavity that forms both bandpass section 111 and mode suppression section 112 when mated with attachable cap 114. Corresponding features on attachable cap 114 are shown in FIG. 5. At the top of view 400, polarizer signal ports 122-123 lead to polarizer element 120. A left-hand polarization (LHP) cavity 212 extends from polarizer signal port 123 toward a termination feature, namely wedge terminator 421. A right-hand polarization (RHP) cavity 211 extends from polarizer signal port 122 to several mode suppression sections 422-423 connected by connecting section 425. RHP cavity 211 then ends at junction 424 at bandpass section 111. As seen in FIG. 4, mode suppression section 422 corresponds to a T0 mode suppressor and mode suppression section 423 corresponds to a TI mode suppressor. These T0 and T1 mode suppression sections attenuate portions of the RF signals transiting RHP cavity 211 to provide selected modes to/from polarizer element 120. Filter waveguide cavity 213 of bandpass section 111 can provide bandpass-style of signal filtering for narrowband operation, such as 20.2-21.2 GHZ. Several alignment holes 431-432 are included in base section 113 for mating/alignment with mating pins (elements 531-532 of FIG. 5) of attachable cap 114. Although this example shows LHP cavity 212 terminated and not extending through a corresponding serpentine cavity, other examples might employ serpentine cavities for both LHP signals and RHP signals, with associated mode suppression structures, filters, and cavities leading to corresponding signal ports.

View 401 shows even further details on the mode suppression cavities in relation to polarizer signal ports 122-123 and junction 424. It should be noted that draft angles (noted by a) are included in all of the surfaces of all of the cavities noted in FIG. 4. These draft angles allow for injection molding techniques and mandrel insertion/removal during manufacturing. Thus, no undercuts or overhangs can be established for the features noted above. Also, the serpentine or meandering cavity configuration provides for a compact linear arrangement which is difficult or impossible to achieve with traditional machining techniques, such as EDM. This compact linear arrangement allows for more compact horn antenna arrays which fit into smaller packaging sizes, very advantageous for deployed satellites and space-constrained feed networks.

FIG. 5 includes view 500 illustrating attachable cap 114 which mounts to base section 113 of any of horn antenna elements 150-155 of FIGS. 1 and 2. View 500 shows a portion of the serpentine or meandering cavity that forms both bandpass section 111 and mode suppression section 112 when mated with base section 113. Corresponding features on base section 113 are shown in FIG. 4. At the top of view 500, input section 510 couples to polarizer signal ports 122-123 when fitted to base section 113. A double-U shaped or double-arc feature at input section 510 provides for RF sealing at polarizer signal ports 122-123. From here, a left-hand polarization (LHP) cavity 512 extends from input section 510 toward a termination feature, namely wedge terminator 521. A right-hand polarization (RHP) cavity 511 extends from input section 510 to several mode suppression sections 522-523 connected by connecting section 525. RHP cavity 511 then ends at junction 524 at bandpass section 111. As seen in FIG. 5, mode suppression section 522 corresponds to a T0 mode suppressor and mode suppression section 523 corresponds to a TI mode suppressor. These T0 and T1 mode suppression sections attenuate portions of the RF signals transiting RHP cavity 511 to provide selected modes to/from polarizer element 120. Filter waveguide cavity 513 of bandpass section 111 can provide bandpass-style of signal filtering for narrowband operation, such as 20.2-21.2 GHz. Several alignment pins 531-532 are included in attachable cap 114 for mating/alignment with mating holes 431-432 of base section 113.

It should be noted that draft angles (noted by a) are included in all of the surfaces of all of the cavities noted in FIG. 5. These draft angles allow for injection molding techniques and mandrel insertion/removal during manufacturing. Thus, no undercuts or overhangs can be established for the features noted above. Also, the serpentine or meandering cavity configuration provides for a compact linear arrangement which is difficult or impossible to achieve with traditional machining techniques, such as EDM. This compact linear arrangement allows for more compact horn antenna arrays which fit into smaller packaging sizes, very advantageous for deployed satellites and space-constrained feed networks.

The configuration of base section 113 and attachable cap 114 shown in the included Figures describes two half-block elements that, when mated, complete the filter and waveguide cavities. The interface between base section 113 and attachable cap 114 is such that no fasteners are required, and that same interface is able to seal along the entire periphery of base section 113 and attachable cap 114. The use of alignment holes with mating pins reduces mis-alignment. Moreover, groove 550 is included on attachable cap 114. Groove 550 can accommodate conductive adhesives in liquid or tape form, and provides channeling to allow adhesives to be retained within the groove and at the mating surfaces between base section 113 and attachable cap 114. An RF seal is made when mounting base section 113 to attachable cap 114 when using conductive adhesive within groove 550. This RF seal can be tuned to prevent RF signals of a particular frequency range from radiating outward from the contained cavities, as well as prevent incursion of external RF signals over that range.

FIG. 6 includes cross-sectional view 600 and isometric wireframe view 601 which illustrate portions of a horn antenna assembly corresponding to polarizer element 620 and horn element 630. Polarizer element 620 can be an example of polarizer element 120, and horn element 630 can be an example of horn element 130, although variations are possible. Polarizer element 620 and horn element 630 can be included in a horn antenna assembly, such as shown for horn antenna assemblies 150-155. Moreover, polarizer element 620 and horn element 630 can be formed from a single piece of material using an injection molding manufacturing technique or other suitable manufacturing techniques noted herein. Typically, polarizer element 620 and horn element 630 will be formed together with a filter section and interface flange to form a horn antenna assembly, and can be formed into arrays or rows using a single piece of material. Draft angles, such as shown for a, are also incorporated into exterior and interior features. Various conductive coatings can be applied to the material that forms the single piece of material onto surfaces which contact RF signals that transit polarizer element 620 and horn element 630.

View 600 shows polarizer element 620 and horn element 630 aligned along a longitudinal axis. Horn element 630 forms RF aperture 633, from which RF signals can be transmitted and RF signals can be received with respect to remote communication nodes. Horn element 630 also includes horn body 631 and horn port 632. Signals are transferred between polarizer element 620 via horn port 632, and horn body 631 forms the horn-shaped shell of material which tapers outward in diameter from horn port 632 to aperture 633. The quantity, angle, and length of each of the tapered sections of horn body 631 can be selected according to target performance characteristics, such as efficiency, bandwidth, frequency range, and other parameters. Although a generally square aperture geometry is employed for horn element 630, other geometries can instead be used.

Polarizer element 620 comprises a waveguide cavity formed by polarizer body 621 which couples to the waveguide cavity of a filter element at two ports, namely ports 622-623. In this example, port 623 corresponds to a LHP signal and port 622 corresponds to a RHP signal. Other configurations of ports and polarizations are possible depending on the polarizer configuration. Polarizer element 620 then couples to horn element 630 at horn port 632. Polarizer element 620 comprises a septum orthomode transducer (OMT) polarizer (SPOL) in this example. Septum 625 splits the waveguide cavity of polarizer element 620 at ports 622-623 and tapers in a stepped fashion until merging with a corresponding sidewall of polarizer body 621. The waveguide cavity also forms aperture 626 which joins with horn port 632. Interface section 624 is included and transitions ports 622-623 to the waveguide cavity of polarizer body 621. Sidewall ridges on sidewalls of polarizer body 621 can be included in some examples, but are omitted for clarity in FIG. 6. These sidewall ridges can be positioned within the septum OMT-polarizer and establish greater separation between waveguide propagation modes and a higher bandwidth. The particular sidewalls onto which these ridges can be positioned would typically be the adjacent sides with respect to septum 625, although additional sidewall ridges can be employed. Sidewall ridges can begin at a maximum thickness at ports 622-623 and taper or step down in thickness until merging with the associated sidewalls. All noted sidewall and septum features can be manufactured using the injection molding techniques noted herein, and also include draft angles.

Figure 7:
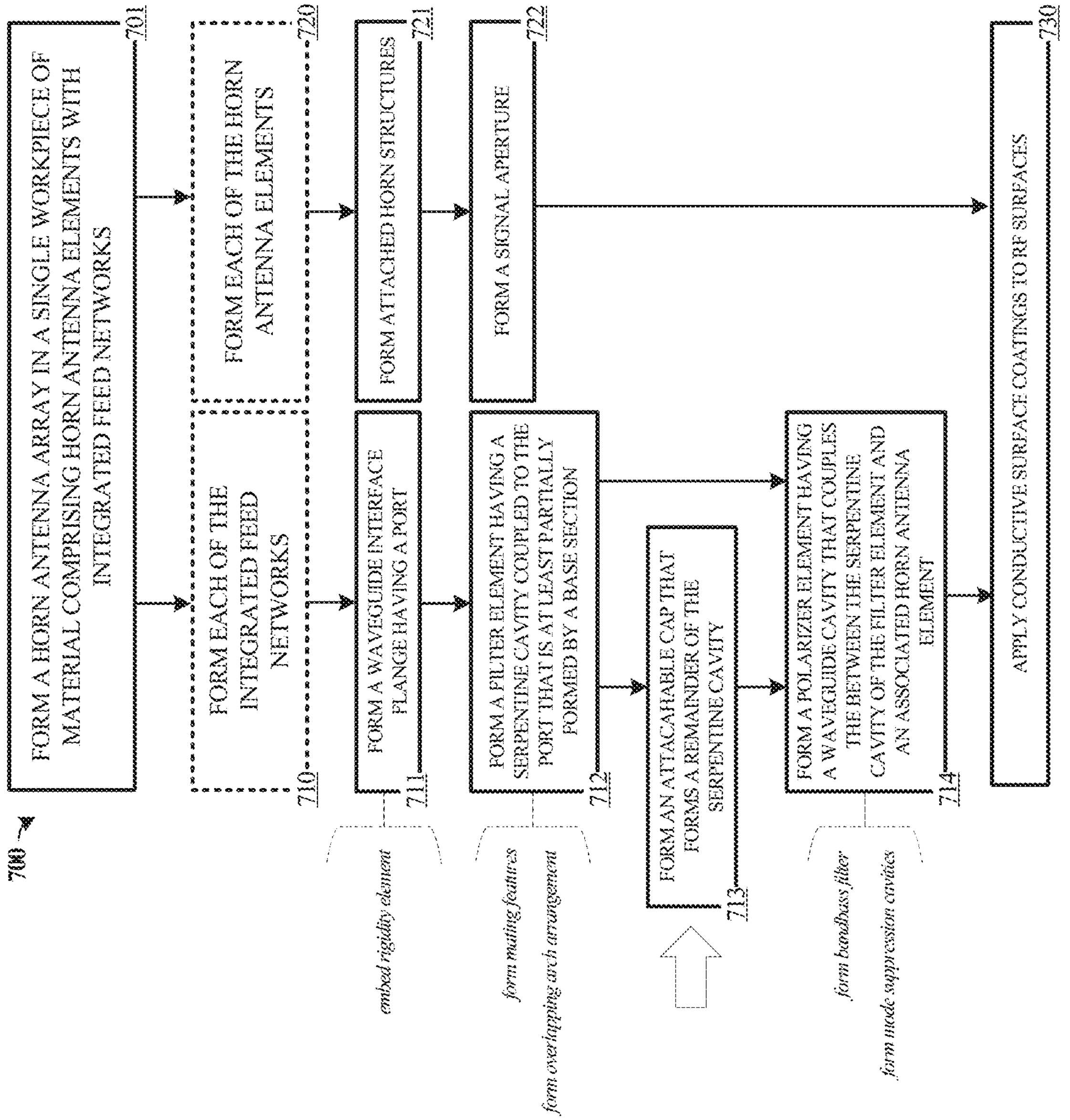
FIG. 7 illustrates operations for manufacturing a horn antenna assembly in an implementation.

Various manufacturing techniques can be employed to form the horn antennas, assemblies, and arrays in the preceding Figures. Some techniques and operations have been noted above. FIG. 7 includes additional operations 700 that illustrate some example manufacturing methods and associated techniques to form horn antenna assemblies 150-155 or antenna array 101 of FIGS. 1-4, attachable cap 114 of FIG. 5, or elements of FIG. 6. Although the operations of FIG. 7 are discussed in the context of an array of several horn antenna assemblies, it should be understood that individual horn antenna assemblies might be formed in a similar manner and joined together in a separate step to form an array. Single horn antenna assemblies might also be formed for applications which do not require an array.

In operation 701, a horn antenna array comprising a plurality of horn antenna assemblies is formed in a single workpiece of material comprising horn antenna elements (130) with integrated feed networks (110 and 120). As a part of this process, various horn antenna assemblies are formed concurrently or semi-concurrently, such as in an injection molding technique. In a first operational subset (710), each of the integrated feed networks are formed, as noted in operations 711-714. In a second operational subset (720), each of the horn antenna elements is formed, as noted in operations 721-722. Finally, a conductive surface treatment is applied in operation 730.

Turning first to the formation of each of the integrated feed networks in operational subset 710, operation 711 includes forming waveguide interface flange 115 having port 116. Interface flange 115 also includes optional features like sealing feature 117, bolt holes or other waveguide connection features, an embedded rigidity element, and cap mating features which form a portion of end seal 118. Forming interface flange 115 might also include forming a plurality of flanges each with associated ports, where the flanges are coupled together by webbing material or into a common portion among all antenna assemblies of the array. Rigidity elements in such configurations can be independent for each interface flange or a single piece which spans more than one interface flange. Operation 712 includes forming filter element 110 having a serpentine cavity coupled to port 116 that is at least partially formed by base section 113. Forming filter element 110 can also include forming various mating features to couple to attachable cap 114, such as the arch portions of end seal 118, adhesive grooves or ridges, and alignment holes or pins. Forming filter element 110 can also include forming several cavity regions including filter waveguide cavity 213 of bandpass section 111, mode suppression cavities 211-212 of mode suppression section 112, and interfacing features to couple associated cavities to polarizer ports 122-123. From here, operation 714 can form polarizer element 120 having polarizer body 121 with internal waveguide cavity and septum features. Polarizer element 120 is formed such that it couples between the serpentine cavity of filter element 110 and associated horn antenna element 130.

As a separate workpiece, attachable cap 114 is formed. Attachable cap 114 can be formed in a different mold than that of the remainder of the serpentine cavity (e.g. sub-assembly 102 of antenna array 101) and later assembled onto sub-assembly 102 using adhesive or other means. In some examples, attachable cap 114 can be formed with sub-assembly 102 from the same workpiece, but with webbing material or other temporary material which is removed or trimmed before final assembly onto sub-assembly 102.

Turning first to the formation of each of horn antenna elements 130 in operational subset 720, operations 721-722 include forming horn body 131 and signal port 132. Horn body 131 comprises a hollow shell of material which defines the horn shape and aperture 133, and signal port 132 comprises an aperture coupling to the waveguide cavity of polarizer element 120. In some examples, such as when forming an array, more than one horn body can be formed together at common/adjacent edges or via webbing material. Thus, the horn elements of an array might form junction points that hold together all of the horn antenna assemblies of the array.

As mentioned above, an injection molding or casting process can be employed to form the various elements of horn antennas, assemblies, caps, and arrays, and each element can comprise geometry incorporating draft angles corresponding to the selected molding or casting technique. This provides for formation from a single workpiece or molded piece of material. Different tooling pull or extraction directions can be employed in a single workpiece, while having draft angles corresponding to the particular tooling pull direction. These draft angles of approximately 1° or 2° are typically a requirement of the manufacturing process tooling to prevent material overhangs or parallel surfaces in order to release the workpiece from a mold or die.

Once the elements of the horn antennas, assemblies, caps, and arrays have been manufactured in the operations noted above, operation 730 indicates that surface coatings or platings can be applied to all surfaces in contact with RF signals. These surfaces include filter cavity surfaces, mode suppression cavity surfaces, sidewalls, septum surfaces, interior surfaces of ports, interior surfaces of apertures, and interior walls of waveguides. Although not required for all applications, certain feature size-sensitive cavities can be formed oversized in diameter and then plated selectively on RF-contacting surfaces. The selective plating process can achieve +/−0.001 inch tolerances for an injection molded part, and thus the oversizing of cavities can provide for correct sizing once plated. Materials employed for the elements of the horn antennas, assemblies, caps, and arrays discussed herein can include any injection-moldable material. Examples include plastics, polymers, carbon composites, polyamide, acrylic, polycarbonate, polyoxymethylene, polystyrene, acrylonitrile butadiene styrene (ABS), polypropylene, polyethylene, polyurethane, thermoplastic rubber, including combinations thereof. Additionally, various additives can be included in the injected material, such as stabilizers, glass or organic fibers, structural elements, lubricants, mold release agents, or other additives. The material can be injected via at least one port into a mold or die which forms the shapes and cavities of the associated elements. Conductive surface treatments include various platings, including conductive materials, metallic substances, metals, metal alloys, and the like, such as aluminum, copper, silver, gold, nickel, or other similar metals or associated combinations.

Thus, the operations in FIG. 7 illustrate example techniques to form a horn antenna assembly and arrays thereof using a single workpiece of material, such as by an injection molding technique. Although the attachable cap is a separate workpiece, this separate piece is mated to the main sub-assembly and bonded such that RF leakage is avoided. With this arrangement, up to 60% reduction in mass can be achieved when compared to separate machined-from-aluminum horn, polarizer, and filters which are then joined using traditional fasteners. Moreover, in large quantities, fabrication costs can be decreased considerably, with fabrication time reduced from months to days or quicker-all while achieving RF performance targets for the associated assemblies and arrays comparable to traditionally-manufactured devices.

It should be understood that various communication bands and frequencies can be employed for the components discussed herein, with corresponding geometry scaling to suit the frequency ranges. For example, the components can support a frequency range corresponding to the Institute of Electrical and Electronics Engineers (IEEE) bands of S band, L band, C band, X band, Ku band, Ka band, V band, W band, among others, including combinations thereof. Other example RF frequency ranges and service types include ultra-high frequency (UHF), super high frequency (SHF), extremely high frequency (EHF), or other parameters defined by different organizations.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The various materials and manufacturing processes discussed herein are employed according to the descriptions above. However, it should be understood that the disclosures and enhancements herein are not limited to these materials and manufacturing processes, and can be applicable across a range of suitable materials and manufacturing processes. Thus, the descriptions and figures included herein depict specific implementations to teach those skilled in the art how to make and use the best options. For the purpose of teaching inventive principles, some conventional aspects have been simplified or omitted. Those skilled in the art will appreciate variations from these implementations that fall within the scope of this disclosure. Those skilled in the art will also appreciate that the features described above can be combined in various ways to form multiple implementations.

What is claimed is:

1. An apparatus, comprising:

a horn antenna array formed in a single workpiece of material comprising horn antenna elements with integrated feed networks;

each of the integrated feed networks comprising:

a waveguide interface flange having a port;

a filter element having a serpentine cavity coupled to the port that is at least partially formed by a base section, wherein a separation interface is established between the base section and an attachable cap that forms a remainder of the serpentine cavity; and a polarizer element having a waveguide cavity that couples between the serpentine cavity of the filter element and an associated horn antenna element that forms a signal aperture.

2. The apparatus of claim 1, wherein the horn antenna array incorporates draft angles suitable for preventing undercuts with respect to a tooling pull direction while using an injection molding manufacturing technique to form the single workpiece of material.

3. The apparatus of claim 1, comprising:

a conductive surface treatment applied to surfaces of the horn antenna array that carry radio frequency signals.

4. The apparatus of claim 1, wherein the attachable cap comprises a different workpiece than the single workpiece of material;

wherein the separation interface between the base section and the attachable cap is established at approximately a zero current region of the serpentine cavity; and wherein the separation interface comprises a mating feature configured to hold at least a portion of a conductive adhesive or an electromagnetic interference gasket positioned between the base section and the attachable cap.

5. The apparatus of claim 1, wherein the separation interface between the base section and the attachable cap comprises an overlapping arch arrangement at an end of the filter element proximate to the waveguide interface flange such that overlapping arch arrangement forms a radio frequency seal at the waveguide interface flange between the base section and the attachable cap.

6. The apparatus of claim 1, wherein the waveguide interface flange comprises a rigidity element embedded in a corresponding portion of the single workpiece of material; and wherein properties of the rigidity element are selected to reduce viscoelastic creep of an interface between the waveguide interface flange and a mating waveguide to below a threshold level.

7. The apparatus of claim 1, wherein the serpentine cavity of the filter element comprises mode suppression cavities between a bandpass section of the serpentine cavity and the polarizer element.

8. The apparatus of claim 1, wherein the serpentine cavity of the filter element is shaped such that the filter element exhibits a bandpass filter behavior for signals carried by the filter element.

9. The apparatus of claim 1, wherein the polarizer element comprises a septum polarizer.

10. A method, comprising:

forming a horn antenna array in a single workpiece of material comprising horn antenna elements with integrated feed networks;

wherein forming each of the integrated feed networks comprises:

forming a waveguide interface flange having a port;

forming a filter element having a serpentine cavity coupled to the port that is at least partially formed by a base section, wherein a separation interface is established between the base section and an attachable cap that forms a remainder of the serpentine cavity; and forming a polarizer element having a waveguide cavity that couples between the serpentine cavity of the filter element and an associated horn antenna element; and wherein forming each of the horn antenna elements comprises:

forming a horn structure; and forming a signal aperture.

11. The method of claim 10, wherein the horn antenna array incorporates draft angles suitable for preventing undercuts with respect to a tooling pull direction while using an injection molding manufacturing technique to form the single workpiece of material.

12. The method of claim 10, comprising:

applying a conductive surface treatment to surfaces of the horn antenna array that carry radio frequency signals.

13. The method of claim 10, comprising:

forming the attachable cap from a different workpiece than the single workpiece of material;

wherein the separation interface between the base section and the attachable cap is established at approximately a zero current region of the serpentine cavity; and wherein the separation interface comprises a mating feature configured to hold at least a portion of a conductive adhesive or an electromagnetic interference gasket positioned between the base section and the attachable cap.

14. The method of claim 10, wherein the separation interface between the base section and the attachable cap comprises an overlapping arch arrangement at an end of the filter element proximate to the waveguide interface flange such that overlapping arch arrangement forms a radio frequency seal at the waveguide interface flange between the base section and the attachable cap.

15. The method of claim 10, wherein the waveguide interface flange comprises a rigidity element embedded in a corresponding portion of the single workpiece of material.

16. The method of claim 10, comprising:

forming the serpentine cavity of the filter element to include mode suppression cavities between a bandpass section of the serpentine cavity and the polarizer element.

17. An apparatus, comprising:

a horn antenna assembly formed in a single workpiece of material comprising a horn antenna element and an integrated feed network;

the integrated feed network comprising:

a waveguide interface flange comprising a port;

a filter element comprising a serpentine cavity coupled to the port and is at least partially formed by a base section, wherein a separation interface is established between the base section and an attachable cap that forms a remainder of the serpentine cavity;

a polarizer element comprising a waveguide cavity that couples between the serpentine cavity of the filter element and a horn antenna element comprising a signal aperture.

18. The apparatus of claim 17, wherein the horn antenna assembly incorporates draft angles suitable for preventing undercuts with respect to a tooling pull direction while using an injection molding manufacturing technique to form the single workpiece of material.

19. The apparatus of claim 17, wherein the separation interface between the base section and the attachable cap is established at approximately a zero current region of the serpentine cavity; and wherein the separation interface comprises a mating feature configured to hold at least a portion of a conductive adhesive or an electromagnetic interference gasket positioned between the base section and the attachable cap.

20. The apparatus of claim 17, comprising:

a conductive surface treatment applied to surfaces of the horn antenna assembly that carry radio frequency signals.

* * * * *